(Model.)
J. H. EAGER.
ADJUSTABLE BRACKET FOR HEATING PURPOSES.
No. 266,446. Patented Oct. 24, 1882.
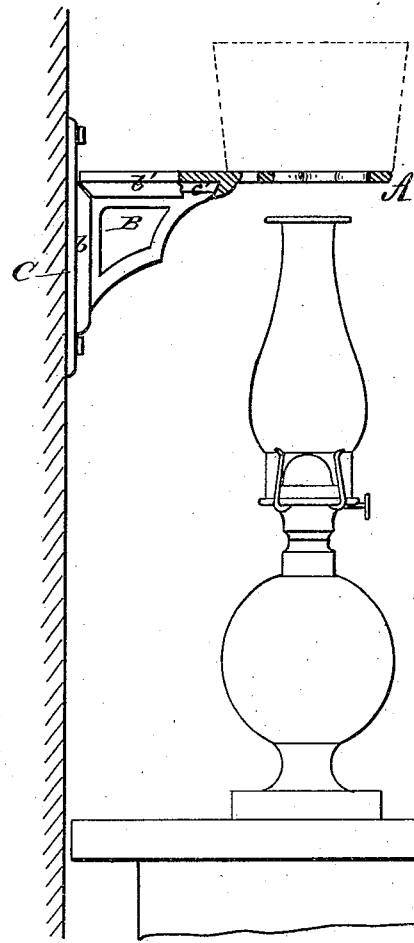
Fig. 1.
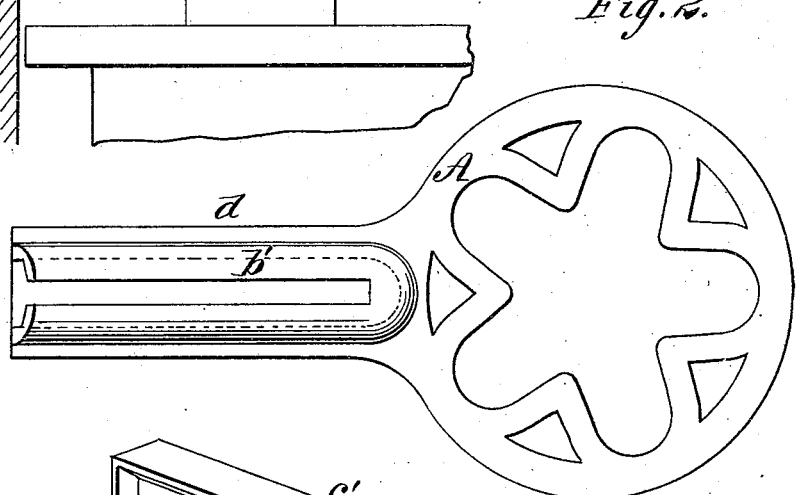
Fig. 4.
Fig. 2.
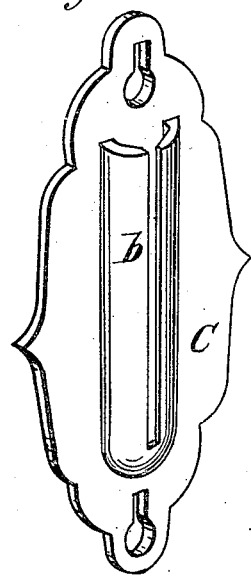
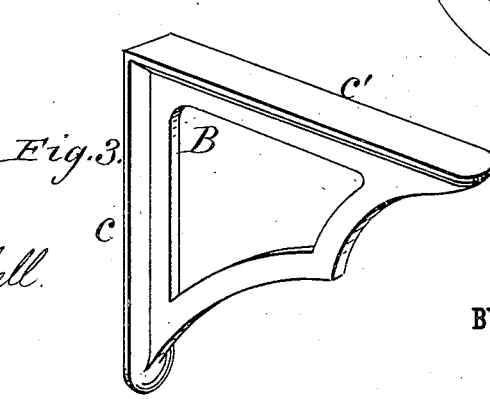
Fig. 3.
WITNESSES:
Dorm Twitchell
C. Sedgwick
INVENTOR:
J. H. Eager
BY Munn & Co
ATTORNEYS.

UNITED STATES PATENT OFFICE.

JOHN H. EAGER, OF NEW ORLEANS, LOUISIANA.

ADJUSTABLE BRACKET FOR HEATING PURPOSES.

SPECIFICATION forming part of Letters Patent No. 266,446, dated October 24, 1882.

Application filed July 19, 1882. (Model.)

*To all whom it may concern:*

Be it known that I, JOHN H. EAGER, of New Orleans, in the parish of Orleans and State of Louisiana, have invented certain new and useful Improvements in Adjustable Brackets for Heating Purposes, of which the following is a full, clear, and exact description.

This invention relates to adjustable brackets, stands, or shelves for holding pots, cups, or other vessels containing water or other fluids or substances designed to be heated over the flame of a lamp or gas-burner; and it consists in a novel and simple construction of such a bracket, whereby not only provision is made for both the vertical and horizontal adjustment of the table or stand portion of the bracket, but the projecting portions of the bracket, when in the way, may be readily removed from the remaining or fixed part of the bracket, and the whole structure, when dismembered, knocks down into a flat contracted space or compass, to facilitate transportation or packing away.

Reference is to be had to the accompanying drawings, forming part of this specification, in which similar letters of reference indicate corresponding parts in all the figures.

Figure 1 represents a partially-sectional elevation of my improved bracket as secured to a wall and arranged over the flame of a lamp. Fig. 2 is an inverted plan, upon a larger scale, of the arm or stand portion of the bracket. Fig. 3 is a perspective view of an angle piece or support which carries the stand, and Fig. 4 is a perspective view of a wall-plate within a socket in which said angle-piece fits.

The bracket, which may be of any desired configuration or pattern, is made up of three parts—to wit, an open-work or perforated stand or stand-piece, A, on which the cup or other article to be heated is placed, an angle or angular support, B, that carries said stand, and a wall-plate, C, into which said support fits. The wall-plate C is designed to be secured to the wall of an apartment by screws or nails, and may remain a permanent fixture, it being a flat plate and but little in the way. It is constructed on its face with an upright slotted socket, *b*, for the angle-support B to fit down within, and, if necessary, for the vertical adjustment of said angle-support to raise or lower the stand A. Said angle-support B is of right-angled construction as regards its vertical arm *c* and horizontal arm *c'*, both of which are flanged laterally, the one, *c*, to fit down within and be retained in place by the socket *b* of the wall-plate C, and the other to fit along within and be retained in place by a horizontal slotted socket, *b'*, on the under side of the stand A or arm *d*, projecting from the stand and forming part of it. This construction of the bracket not only admits of a horizontal sliding adjustment of the stand A, and, if necessary, of a vertical adjustment of the support B, (set-screws or other devices being used, if necessary, to hold the sliding parts in position;) but the three parts A, B, and C of which the bracket is composed are all of a flat construction, so that the bracket, when dismembered or knocked down, occupies a flat contracted space or compass to facilitate transportation or packing away, and when in place, but not in use, not only the stand A, but also, if necessary, the support B, may be readily removed from the wall-plate C, so as to be out of the way. Furthermore, the bracket, when in use, in no way interferes with the light from the gas or lamp burner. When used in connection with a lamp the stand A should be situated so as to be half an inch (more or less) above the lamp-shade. A portable bracket constructed as described will be found very convenient in bed-rooms and many other places.

I am aware that it is not new to form a metallic bracket of a wall-plate, a shelf-plate, and a brace all locked together by screws, or to connect two arms by a dovetail-joint, so that one may be adjustable on the other, or to make a lamp-stand with a vertically-sliding shank held adjustably by a set-screw; but What I do claim as new and of my invention is—

The combination of the plate A, having arm *d* and slotted socket *b'*, the angle-plate B, having the laterally-flanged arms *c c'*, and the flat plate C, having the slotted socket *b*, as and for the purpose specified.

JNO. H. EAGER.

Witnesses:
G. A. WEBER,
EBEN WARREN.